Patented Dec. 18, 1934

1,984,788

UNITED STATES PATENT OFFICE

1,984,788

TREATMENT OF TEXTILE MATERIALS MADE OF OR CONTAINING ORGANIC DERIVATIVES OF CELLULOSE

George Holland Ellis and Ralph Charles Storey, Spondon, near Derby, England, assignors to Celanese Corporation of America, a corporation of Delaware No Drawing. Application May 5, 1931, Serial No. 535,297. In Great Britain July 10, 1930

9 Claims. (Cl. 28—1)

This invention relates to improvements in the treatment of materials composed of or containing organic derivatives of cellulose and in particular to a process whereby such materials may be delustred to any desired degree.

It is well known that phenol and other phenolic substances are capable of exerting a solvent or swelling action upon organic derivatives of cellulose, and that as a preliminary stage in the said action delustring of the cellulose derivative may occur. For various purposes it is often of great advantage to be able to reduce or destroy the lustre of organic derivatives of cellulose without deleteriously affecting the material. Processes whereby this effect can be achieved are therefore in great demand.

The surprising discovery has now been made that phenol and other phenolic bodies, in very low concentration, for example in concentration of the order of $$\frac{N}{10}$$

or below may be generally applied with valuable results as delustring agents for cellulose acetate and other organic derivatives of cellulose, and that by suitably adjusting the concentration, for example by employing solutions of concentration between $$\frac{N}{40}$$

and $$\frac{N}{10},$$

any desired degree of delustring may be obtained without damage to the material. The process admits of a very good control of the degree of delustring as compared, for example, with the customary method using a simple soap solution.

Among the phenolic bodies which may be employed in carrying out our invention ordinary phenol is particularly suitable, but other phenolic bodies may also be employed with advantage, for example, cresols and xylenols, resorcinol and their nuclear substitution products, for example the mono-chlor-phenols.

The phenols are employed in very dilute solution, preferably in a concentration of the order of $$\frac{N}{10}$$

or below. We prefer to employ solutions of concentration between $$\frac{N}{40}$$

and $$\frac{N}{10},$$

and especially between $$\frac{N}{30}$$

and $$\frac{N}{10},$$

i. e. about 2.4 to 10 grams or 3.1 to 10 grams per litre in the case of phenol itself. Somewhat higher concentrations may be used but it is not advisable to employ solutions stronger than about 15 grams per litre for fear of damaging the material.

The phenolic solution may be applied to the material at any suitable temperature up to the boiling point of the solution, but we have found it most advantageous to maintain the solution at temperatures of the order of 75° C.—90° C.

The solution may be applied to the material by any suitable means, for example by immersion of the material in a bath, by means of a padding mangle, by brushing or spraying. The solution may be thickened if so desired. Pattern effects may be obtained by suitable means, for example by a local application to the material to be treated of suitable resists or by stencilling.

The material may be coloured by the application, in conjunction with the delustring treatment, of suitable dyestuffs, for example dispersed insoluble dyestuffs. The dyestuffs may be applied to the material before, after or during the delustring treatment. Thus for example excellent results are obtained by treating the material with a 0.7% solution of phenol containing one of the following colouring agents:—

1-amino-4-hydroxy-anthraquinone, 1-methylamino - 4 - hydroxy-anthraquinone, 2-nitro-4-chloro-diphenylamine, 1-amino-4-methylaminoanthraquinone, 1:4-dimethyl-amino-anthraquinone.

After the completion of the delustring treatment the material is preferably well rinsed to remove phenol and dried. Where difficulty is experienced in removing the last traces of phenol, treatment with a scouring agent suitable for use in conjunction with materials comprising organic derivatives of cellulose, for example a dispersion of xylene in Turkey red oil may be employed with advantage.

The following examples illustrate the invention:—

Example 1

Cellulose acetate woven fabric, previously scoured in a normal manner, is suspended by the selvedge in folded form in a bath containing an aqueous solution of 3½ grams per litre phenol. The goods are slowly worked in this bath at 78–80° C. for 15 to 20 minutes, when they are lifted, well washed off, and dyed or otherwise treated as requisite.

A partial delustred effect is thereby obtained.

Example 2

Cellulose acetate knitted fabric, previously scoured and dyed by known means, for example by means of dispersed insoluble dyestuffs, is treated in rope form on the winch machine in a 50:1 bath containing an aqueous solution of 10 grams per litre phenol. Treatment is conducted at 80° C. for one hour, when the goods are lifted, well washed off, soaped, washed off again, and dried or otherwise treated as requisite.

A fully delustred fabric is thereby obtained.

Example 3

Cellulose acetate woven fabric, after scouring in the normal manner, is dyed and simultaneously partially delustred by treatment on the jigger in a bath set with ½ gram per litre soap, ½% of 1:4-dimethyl-amino-anthraquinone, (on weight of fabric) and 5 grams per litre phenol. The operation is conducted at 80–90° C. for one to one and a half hours, when the goods are well washed off, hydro-extracted, and dried or otherwise treated as requisite.

A partially delustred fabric of light blue shade is thereby obtained.

Any desired treating agent may be applied to the material in conjunction with the application of the phenol. For example soaps, sulphonated oils and other wetting, dispersing or cleansing agents may be applied before, after or during the treatment. Thus the material may with advantage be treated prior to or during the application of the phenol with a solution of Turkey red oil in xylene. Such treatment may improve the properties of the material in various ways, it may for example improve the "feel" and substantially increase the coefficient of friction of the individual filaments or fibres of a material and so reduce any tendency towards slipping or laddering. Treatment with the same reagent after the delustring operation provides a ready means of removing any phenol remaining therein. The presence of soap in the phenol solution enables a soft finish to be imparted to the materials, particularly if some proportion of the soap is allowed to remain therein, and may also play a part in the delustring. Valuable results are obtained with phenol solutions containing from ½% or less to 3% or more of soap. When soaps or other alkaline agents are contained in the treating liquid applied to cellulose esters, the alkalinity of the solution and the time of treatment should be so controlled as to avoid any deleterious action upon the cellulose ester. We prefer to work with baths the pH concentrations of which lie between 9.5 and 7.5.

Although the invention may be applied with particular advantage to materials comprising cellulose acetate it is in no sense limited in application thereto, but is generally applicable to filaments, threads, fibres, ribbons, straws, fabrics, films and the like, composed of or containing organic derivatives of cellulose in general, for example cellulose formate, propionate and butyrate and methyl, ethyl and benzyl cellulose.

What we claim and desire to secure by Letters Patent is:—

1. Process for reducing the lustre of filaments, yarns, ribbons, fabrics and like materials comprising cellulose acetate, comprising treating said materials at high temperatures with a monohydric phenol in concentration not greater than that of a deci-normal solution.

2. Process for reducing the lustre of filaments, yarns, ribbons fabrics and like materials comprising organic derivatives of cellulose, comprising treating said materials at temperatures above 75° C. with phenol in concentration not greater than that of a deci-normal solution.

3. Process for reducing the lustre of filaments, yarns, ribbons, fabrics and like materials comprising cellulose acetate, comprising treating said materials at temperatures above 75° C. with phenol in concentration not greater than that of a deci-normal solution.

4. Process for reducing the lustre of filaments, yarns, ribbons, fabrics and like materials comprising cellulose acetate, comprising treating said materials at high temperatures with a monohydric phenol in concentration between that of an $\frac{N}{10}$ and that of an $\frac{N}{30}$ solution.

5. Process for reducing the lustre of filaments, yarns, ribbons, fabrics and like materials comprising organic derivatives of cellulose, comprising treating said materials at temperatures above 75° C. with phenol in concentration between that of an $\frac{N}{10}$ and that of an $\frac{N}{30}$ solution.

6. Process for reducing the lustre of filaments, yarns, ribbons, fabrics and like materials comprising cellulose acetate, comprising treating said materials at temperatures above 75° C. with phenol in concentration between that of an $\frac{N}{10}$ and that of an $\frac{N}{30}$ solution.

7. Process for reducing the lustre of filaments, yarns, ribbons, fabrics and like materials comprising organic derivatives of cellulose, comprising treating said materials at high temperatures with monohydric phenols in low concentration, the treatment being effected in a medium of pH value between 7.5 and 9.5.

8. Process for reducing the lustre of filaments, yarns, ribbons, fabrics and like materials comprising organic derivatives of cellulose, comprising treating said materials at temperatures above 75° C. with phenol in low concentration, the pH value of the medium being between 7.5 and 9.5.

9. Process for reducing the lustre of filaments, yarns, ribbons, fabrics and like materials comprising cellulose acetate, comprising treating said materials at temperatures above 75° C. with phenol in low concentration, the pH value of the medium being between 7.5 and 9.5.

GEORGE HOLLAND ELLIS.
RALPH CHARLES STOREY.